No. 630,431. Patented Aug. 8, 1899.
E. M. WILDEY.
BACK PEDALING BRAKE.
(Application filed Dec. 8, 1898.)
(No Model.)
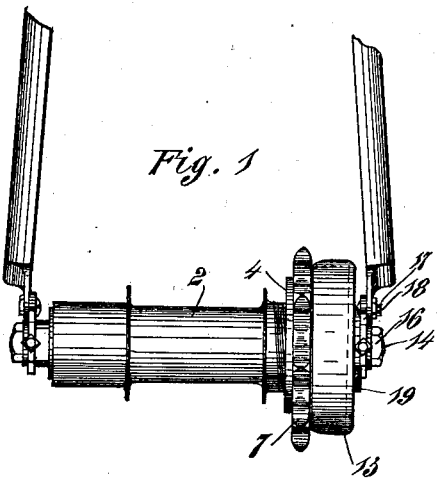
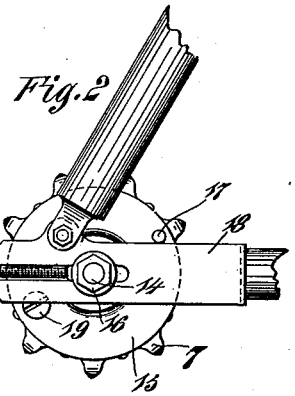
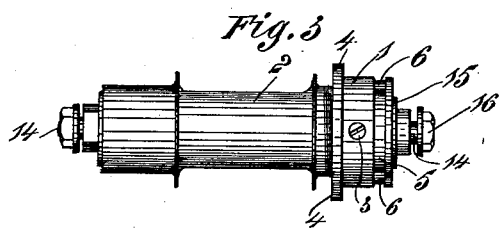
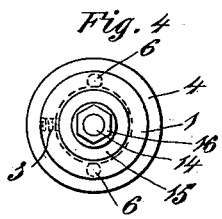
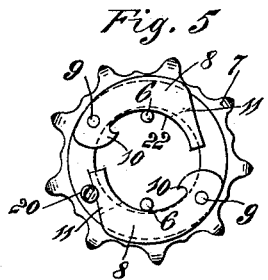
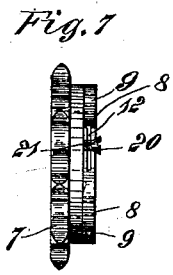
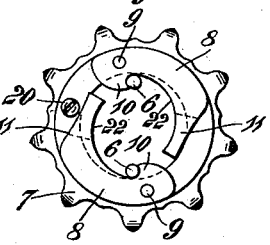
Witnesses:
E. B. Bolton
Inventor:
Edward Milton Wildey
By Richards
his Attorneys.

UNITED STATES PATENT OFFICE.

EDWARD MILTON WILDEY, OF DUNEDIN, NEW ZEALAND.

BACK-PEDALING BRAKE.

SPECIFICATION forming part of Letters Patent No. 630,431, dated August 8, 1899.

Application filed December 8, 1898. Serial No. 698,645. (No model.)

*To all whom it may concern:*

Be it known that I, EDWARD MILTON WILDEY, a subject of the Queen of Great Britain, and a resident of 2 Commercial Chambers, Manse street, Dunedin, New Zealand, have invented an Improved Adjustable Brake for Bicycles and the Like, of which the following is a specification.

This invention relates to brakes, and more especially to those used upon bicycles; and the object of the invention is to provide a strong, simple, and efficient brake which when fitted to such a piece of mechanism as a bicycle will operate when pressure is applied to the pedals in a direction reverse to that employed for propelling the machine forward.

In applying the invention to a bicycle I fix upon the rear hub a sleeve or collar provided with a flange and a groove, and in the groove I fix two pins. The sprocket-wheel of this rear hub fits freely upon the sleeve, so that it may revolve thereon. Two brake blocks or arms are pivoted to the face of the sprocket and have slit ends which take into the aforesaid groove of the sleeve. The pivoted ends of these brake-blocks are furnished with hooks.

In propelling the machine the sprocket-wheel carries around the brake-blocks, the hooks of which engage with the aforesaid pins and revolve the sleeve and wheel. Upon the motion of the wheels being arrested, or partially so, the pin runs up the eccentric face of the brake-blocks and forces the same against the interior periphery of a cap which covers in the different parts and has a pin resting upon the frame of the machine and is thus held from revolving.

The appended drawings illustrate the invention as applied to a bicycle, and will now be referred to for purposes of a detailed description.

Figure 1 is a rear view of a bicycle-hub fitted with the invention. Fig. 2 is a side view of the same. Fig. 3 illustrates the hub with the sprocket-wheel, brake-blocks, and cap removed. Fig. 4 is an end view of the same. Fig. 5 is an end view of the sprocket-wheel, showing the position of the brake-blocks when the brake is applied. Fig. 6 is a similar view showing the position of the blocks when the brake is not applied. Fig. 7 is a rear view of the same.

Similar figures of reference indicate corresponding parts throughout the views.

Describing the invention by the aid of the drawings, the sleeve 1 is screwed to the hub 2 and further secured by the set-screw 3 or is fastened thereto in any other convenient manner. This said sleeve has a flange 4 and groove 5, across which the pins extend. The rear sprocket-wheel 7 fits freely upon the sleeve 1 against the flange 4 and is furnished with brake-blocks 8, pivoted upon pins 9. Near the pivots 9 these said brake-blocks are formed into hooks 10 and have their ends 11 provided with slits 12, their thickness being such that they will pass into the groove 5 with some considerable friction. The cap 13 fits upon the axle 14 and is held against the face 15 by the ordinary nut 16. The pin 17, secured to the cap 13, rests upon the chain-stay 18. A screw 19 in the said cap gives access to the conical head 20 of screw 21.

When the pedals are driving the sprocket-wheel 7 in a forward direction, the hooks 10 engage with the pins 6 and revolve the sleeve 1, hub 2, and the rear wheel of the bicycle. Upon a reversal of the pressure upon the pedals the motion of the sprocket-wheel is checked and the pins 6 run up the eccentric faces 22 of the brake-blocks, as shown by Fig. 5, forcing the same against the interior periphery of the cap, with the result that the progress of the machine is partially or wholly arrested, since the said cap is prevented from revolving by the pin 17.

Upon a renewal of pressure upon the pedals to drive the machine forward the sprocket-wheel advances upon the sleeve until the hooks 10 engage with the pins 6. The pressure then draws the brake-blocks inward, as shown by Fig. 6, and out of contact with the cap.

By means of slits 12 the ends 11 of the brake-blocks are spread open to fit tightly in the groove 5, and thus cause friction against the sides of the said grooves and prevent the brake coming into or out of action too freely.

The screw 21 and its conical head 20 provide means for adjusting the pressure of the brake-blocks against the cap, since a certain amount of spring exists in the different parts.

By screwing the screw into the sprocket-wheel the range of movement of the blocks will be reduced, and by withdrawing the same an opposite effect is produced, or by screwing the screw hard down the brake may be prevented from being brought into action altogether. This adjustment may be made by taking out the screw 19 and reaching the screw 21 through the hole in the cap.

Having now particularly described and ascertained the nature of my said invention and in what manner the same is to be performed, I declare that what I claim is—

1. In combination with the hub of the wheel, a sleeve secured thereto and having a circumferential groove, pins extending across said groove, a sprocket-wheel fitted on the sleeve to turn thereon, brake-blocks pivoted to the face of the sprocket-wheel, said brake-blocks having hooked ends to engage the pins and having also edges against which the pins bear in back-pedaling to force the blocks outwardly, said blocks having also slits in their ends leaving sides slightly spread apart and fitting in the groove of the sleeve, a cap secured to the axle and extending over the sleeve and brake-blocks and adapted to be borne upon by the latter, and a pin in the cap resting on the machine-frame, substantially as described.

2. In combination with the hub of the wheel, a sleeve secured thereto and having a circumferential groove, pins extending across said groove, a sprocket-wheel fitted on the sleeve to turn thereon, brake-blocks pivoted to the face of the sprocket-wheel, said brake-blocks having hooked ends to engage the pins and having also edges against which the pins bear in back-pedaling to force the blocks outwardly, said blocks having also slits in their ends leaving sides slightly spread apart and fitting in the groove of the sleeve, a cap secured to the axle and extending over the sleeve and brake-blocks and adapted to be borne upon by the latter, a pin in the cap resting on the machine-frame, a screw having a conical head for regulating the action of the brake-block and a screw in the cap to give access to the regulating-screw, substantially as described.

In witness whereof I have hereunto set my hand in presence of two witnesses.

EDWARD MILTON WILDEY.

Witnesses:
 A. F. PARK,
 J. R. PARK.